US012280609B2

(12) United States Patent
Weissborn

(10) Patent No.: US 12,280,609 B2
(45) Date of Patent: Apr. 22, 2025

(54) METHOD FOR PRINTING A STRUCTURED SILVER COATING HAVING IMPROVED CURRENT-CARRYING CAPACITY

(71) Applicant: SAINT-GOBAIN GLASS FRANCE, Courbevoie (FR)

(72) Inventor: Klaus Weissborn, Übach-Palenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1133 days.

(21) Appl. No.: 17/050,323

(22) PCT Filed: Apr. 4, 2019

(86) PCT No.: PCT/EP2019/058490
§ 371 (c)(1),
(2) Date: Oct. 23, 2020

(87) PCT Pub. No.: WO2019/206592
PCT Pub. Date: Oct. 31, 2019

(65) Prior Publication Data

US 2021/0053376 A1 Feb. 25, 2021

(30) Foreign Application Priority Data

Apr. 25, 2018 (EP) .................................... 18169255

(51) Int. Cl.
*B41M 1/12* (2006.01)
*B41M 1/34* (2006.01)
(Continued)

(52) U.S. Cl.
CPC .............. *B41M 3/006* (2013.01); *B41M 1/12* (2013.01); *B41M 1/34* (2013.01); *H05B 3/12* (2013.01);
(Continued)

(58) Field of Classification Search
None
See application file for complete search history.

(56) References Cited

U.S. PATENT DOCUMENTS 4,388,522 A 6/1983 Boaz
5,264,263 A * 11/1993 Polat ........................ H05B 3/84
428/432
(Continued)

FOREIGN PATENT DOCUMENTS

DE 32 31 382 A1 3/1984
DE 41 11 625 C2 1/1993
(Continued)

OTHER PUBLICATIONS

International Search Report as issued in International Patent Application No. PCT/EP2019/058490, dated Jun. 12, 2019.
(Continued)

*Primary Examiner* — Francisco W Tschen
(74) *Attorney, Agent, or Firm* — Pillsbury Winthrop Shaw Pittman LLP

(57) ABSTRACT

A method for producing a silver coating on a glass pane, wherein the silver coating includes at least one busbar and/or at least one solder contact surface, wherein the method includes printing the silver coating onto the glass pane by screen printing with a printing pattern having printing and non-printing regions and baking the printed silver coating, wherein the printing region of the printing pattern for the busbar and/or the printing region of the printing pattern for the solder contact surface is provided at least partially with a dot matrix or a line matrix.

19 Claims, 4 Drawing Sheets

(51) Int. Cl.

| | |
|---|---|
| ***B41M 3/00*** | (2006.01) |
| ***H05B 3/12*** | (2006.01) |
| ***H05B 3/84*** | (2006.01) |

(52) U.S. Cl.

CPC ......... *H05B 3/84* (2013.01); *H05B 2203/013* (2013.01); *H05B 2203/016* (2013.01); *H05B 2203/017* (2013.01)

(56) References Cited

U.S. PATENT DOCUMENTS

| | | | | |
|---|---|---|---|---|
| 5,390,595 | A * | 2/1995 | Cutcher | G03F 7/12<br>219/203 |
| 2006/0035051 | A1 * | 2/2006 | Lhoest | B32B 17/10761<br>219/203 |
| 2010/0213183 | A1 * | 8/2010 | Schall | H05B 3/84<br>49/70 |
| 2019/0174582 | A1 * | 6/2019 | Guignard | B32B 17/10174 |

FOREIGN PATENT DOCUMENTS

| | | | | |
|---|---|---|---|---|
| EP | 0 281 351 | A1 | 9/1988 | |
| EP | 0 465 311 | A1 | 1/1992 | |
| EP | 0 830 255 | A1 | 3/1998 | |
| EP | 1 748 034 | A1 | 1/2007 | |
| WO | WO 96/40525 | A1 | 12/1996 | |
| WO | WO 2005/105691 | A1 | 11/2005 | |
| WO | WO 2013/156184 | A1 | 10/2013 | |
| WO | WO-2018020082 | A1 * | 2/2018 | B23K 35/262 |

OTHER PUBLICATIONS

Opposition filed against European Application No. 19714224.3, dated Jul. 10, 2024.

* cited by examiner

PRIOR ART

METHOD FOR PRINTING A STRUCTURED SILVER COATING HAVING IMPROVED CURRENT-CARRYING CAPACITY

CROSS-REFERENCE TO RELATED APPLICATIONS

This application is the U.S. National Stage of PCT/EP2019/058490, filed Apr. 4, 2019, which in turn claims priority to European patent application number filed 18 169 255.9 filed Apr. 25, 2018. The content of these applications are incorporated herein by reference in their entireties.

The invention relates to a method for producing a silver coating on a glass pane by screen printing and the glass pane produced by the method, which is preferably a heatable vehicle pane.

To produce heatable vehicle panes, glass panes are provided with busbars and heating conductors. The busbars have solder contact surfaces for the power connection. If required, solder contact surfaces for the connection of antennas or alarm loops can be applied to glass panes. Busbars, heating elements, and solder contact surfaces are applied to the glass pane in the form of electrically conductive layers, usually silver layers. A common method for applying the silver coating to the glass pane is screen printing with a silver paste as printing ink.

In screen printing, the thickness or height of the print can be determined by the fabric type or the thread thickness of the fabric and the layer thickness of the coating of the screen. In the case of larger structures such as the busbar, this applies with regard to the coating of the screen but only to the edge of the busbar, but the effect is not effective in the central region of the busbar.

This problem with the screen printing of larger structures such as busbars results from the formation of so-called “print shoulders” on the stencil edge, which usually have a maximum width of 1 mm (cf. FIG. 1). Consequently, a relatively large amount of the printing paste material is situated in the edge regions of the busbar to be formed, whereas only small amounts of material are printed in the center of the busbar. As a result, only relatively low heights or thicknesses are achieved for the busbar.

However, for many applications, it is desirable to print busbars that have a greater thickness than is possible with simple screen printing. A greater thickness causes a reduction in electrical resistance, which increases the current-carrying capacity of the busbars and the temperature development during passage of current is reduced. Greater height or thickness of the busbar can also be advantageous for reducing the width of the busbar while maintaining the same current-carrying capacity.

Increased thickness of the printed structure can also be advantageous in the case of solder contact surfaces, since this increases the strength and robustness against aging of the soldered connection with soldered-on connection elements, in particular when lead-free connection elements are used.

For increasing the printing thickness of the silver coating, a double silver print with an intermediate drying step is conceivable. However, this complicates the method and increases processing time. Furthermore, increased printing thickness is usually not required in all regions of the silver coating or is not even possible due to process tolerances such that unnecessary material consumption results or different stencils would be needed for the two printing operations.

According to the prior art, in the case of insufficient print thickness, additional solder contact areas or flat wires are installed in order to distribute the current better. However, this creates additional costs.

The printing thickness can also be adapted by increasing the silver content in the silver paste. The maximum possible silver content in the printing paste is, however, limited.

In addition, special threads, known to the person skilled in the art as various silks, which use different thread diameters for a vertically limited region, are used for the printing screens. With them, different printing thicknesses can also be produced for vertically limited regions. However, there are limits here both in terms of the different printing thicknesses as well as the positioning of the regions with increased thickness.

DE 4111625 C2 describes a soldering region for busbars of heatable car windows that is applied with a conductive silver paste by screen printing and is implemented as a group of positive and negative lines in the longitudinal direction of the busbar.

EP 0465311 A1 relates to a heatable glass pane with electrical heating conductors that has white busbars applied by screen printing that are arranged along two parallel edges and are partially covered with a colored layer. For this, the busbar can be coated with a series of black strips leaving white regions free. The blackening operation is done by applying a new black enamel layer.

U.S. Pat. No. 5,264,263 A describes a heatable glass pane with electrical heating conductors that has light-colored busbars applied by screen printing. The light-colored busbars are partially covered with a dark enamel coating, e.g., in the form of a series of black strips. It is possible to control the heating of the glass pane by modifying the pattern of the enamel coating.

EP17480341 A1 describes a glass plate with printed conductive elements, wherein the glass plate is provided along the periphery with a dark ceramic print on which busbars are applied by screen printing. The busbars have recesses in which the ceramic print is exposed. A large number of small dots of the material of the busbar can be printed in the recesses together with the busbar.

The object of the invention consists in providing a method for forming busbars and/or solder contact surfaces on a glass pane by means of a silver coating that enables increased printing thickness of the busbars and/or solder contacts compared to the printing thicknesses achievable with screen printing methods according to the prior art. A more uniform distribution of the printed printing paste over the width of the busbar or the soldering surfaces for the solder contact should be achieved, whereby in particular a more uniform distribution of the printing paste should be enabled.

The method should be simple to carry out and, in particular, require no additional work steps. Moreover, it should be possible to apply an increased thickness only in certain areas of the busbar, for example, in the region of the soldering surfaces.

The object of the invention was successfully achieved through the use of a dot matrix or a line matrix in the printing regions of the printing pattern for the busbar and/or the soldering surfaces.

The object is, consequently, accomplished according to the invention by a method according to claim 1 and a glass pane according to claim 15 obtainable with the method. Preferred embodiments of the invention are apparent from the dependent claims.

The method according to the invention enables a greater printing thickness, by modifying the printing pattern to overcome the technical problems described above. In the printing region in which the printing pattern is at least partially implemented with the dot matrix or line matrix and the screen is, optionally, more thickly coated in the region, the printing region is printed with a greater ink volume per area than in a printing region without a partially coated dot matrix or line matrix.

By using the dot matrix or line matrix in the printing region in accordance with the invention, it is possible, for example, to achieve a wet printing thickness that is thicker by 5 to 100 μm than the wet layer thickness obtained with the same method but without the use of the dot matrix or line matrix. Accordingly, a greater layer thickness is also obtained after baking. To the naked eye, the wet layer is also evenly distributed over the entire width of the busbar or the solder contact surface. Only when magnified with a magnifying glass or a microscope are multiple small elevations noticeable in the printed image.

The greater thickness causes a reduction in resistance, as a result of which the current-carrying capacity of the busbars is increased and the temperature development when current flows through is reduced, in particular at neuralgic points such as the solder contact surfaces, e.g., the solder contact surfaces of the busbar. The greater thickness can also be used to reduce the width of the busbar while retaining the same current-carrying capacity. In the case of the solder contact surfaces, the greater thickness results in increased strength of the solder connection with soldered-on connection elements, in particular when lead-free connection elements are used.

Accordingly, the invention relates to a method for producing a silver coating on a glass pane, wherein the silver coating includes at least one busbar and/or at least one solder contact surface, with the method including the steps of printing the silver coating onto the glass pane by screen printing with a printing pattern having printing and non-printing regions and the baking of the printed silver coating, with the printing region of the printing pattern for the busbar and/or the printing region of the printing pattern for the solder contact surface provided at least partially with a dot matrix or line matrix.

For the person skilled in the art, it was surprising and unexpected to be able to achieve a greater thickness of the printing region with such structuring of the printing region. Since, with structuring of the printing region, printing free areas are created, the person skilled in the art would expect a lower application of material and degraded current-carrying capacity. The inventors have been able to show that with the printing method according to the invention greater print height and an improvement in the current-carrying capacity can be achieved through specific structuring of the printing region.

The invention is explained in detail in the following.

In the following, the expressions “left/right” and “top/bottom/refer to the installed position of the glass pane in a vehicle. The direction from “top” to “bottom” is then the longitudinal direction and the direction from “left” to “right” is the transverse direction. “Top” refers to the pane edge adjacent the roof edge of the car body in the installed position in a motor vehicle. On the other hand, “bottom” describes the pane edge pointing toward the engine edge in a windshield and toward the trunk opening in the case of a rear window. “Left” and “right” refer, in the case of a windshield, to the pane edges adjacent the A-pillars of the body, whereas the “left” and “right” pane edge of a rear window is adjacent the C-pillar or D-pillar, respectively, of the car body.

The expressions “solder contact surface” and “solder surface” are used synonymously in the following. A solder contact can be soldered onto the glass at the solder contract surface, with the solder contact constituting a connection element.

The silver coating on the glass pane includes at least one busbar and/or at least one solder contact surface. The silver coating preferably includes at least one busbar and, optionally, at least one solder contact surface for an alarm loop and/or at least one solder contact surface for an antenna. The silver coating particularly preferably includes at least one busbar and a plurality of heating conductors and, optionally, at least one solder contact surface for an alarm loop and/or at least one solder contact surface for an antenna.

Busbars are electrically conductive strips that are positioned on the glass pane. The busbar is also referred to as a current collector rail. Usually, two busbars running in a longitudinal direction are applied in the region of the right and/or left side edge of the glass pane, which busbars can also extend into the region of the top and bottom side edge. Also possible are two busbars running in a transverse direction in the region of the bottom and/or top side edge of the glass pane. Consequently, the silver coating preferably includes two busbars. There are also embodiments in which not just one busbar is applied in the region of the side edge of the glass pane, but instead two or more busbars separated from one another. In this case, more than two busbars are present.

If the silver coating includes at least one busbar, usually at least two busbars, the silver coating usually also forms a plurality of heating conductors that are positioned between the busbars, usually transverse thereto.

On the busbars, the coating also usually forms solder contact surfaces for the busbar. Connection elements via which supply lines for the power connection can be mounted can be attached or soldered to these solder contact surfaces. The current is highest in the region of the solder contact surfaces of the busbar, but with good design, the thermal output is provided via the heating surface to be defrosted (heating conductor) and the busbar and the solder contact remained as cold as possible.

Alternatively, or additionally, at least one solder contact surface that is not provided for the busbar can be formed by the coating. The solder contact surface can, for example, be a solder contact surface for an alarm loop or a solder contact surface for an antenna. Solder contacts or connection elements via which elements of the antenna or the alarm loop can be mounted can be attached or soldered onto these solder contact surfaces.

An alarm loop usually comprises an electrically conductive print or wire. In the activated state, the alarm loop receives a continuous quiescent current that is interrupted upon breakage of the pane and triggers an alarm. Such alarm loops are, for example, described in WO 2013/156184 A1.

The busbar can have a constant width over its length. Usually, however, the busbar has an irregular geometry, the width being different at different locations. In a preferred embodiment, the busbar has a maximum width in the range from 9 to 30 mm, preferably 9 to 16 mm.

The solder contact surfaces can, for example, have a rectangular, oval, or circular geometry. The solder contact surfaces can, for example, have a maximum dimension in the range from 4 to 24 mm. The maximum dimension in the case of the circle is the diameter; with a rectangle, the diagonal.

The method according to the invention includes the step of printing the silver coating onto the glass pane by screen printing with a printing pattern having printing and non-printing regions. The screen printing is carried out in particular with a silver paste or conductive silver paste as printing ink.

The printing pattern is a screen that is stretched in a frame and has non-printing regions in which the screen is provided with a coating, which is also referred to as a stencil, and printing regions in which the screen is free of coating. As a result of the stencil, the screen is impermeable to ink at all non-printing regions and permeable to ink at the printing regions. The frame is usually a metal frame; steel frames or aluminum frames are common, for example, with aluminum frames preferred.

The screen is usually a woven fabric made of plastic threads or metal threads. The threads are made, for example, of polyamide, polyester, carbon fiber, or stainless steel, with fabrics made of polyester threads particularly preferred. The thread diameter of the fabric, in particular of the polyester fabric can, for example, expediently be in the range from 30 to 150 μm, preferably 77 to 120 μm, and the screen denier of the fabric can, for example, be in the range from 43 to 180 threads per cm, preferably 77 to 150 threads per cm.

Situated at the non-printing regions of the printing pattern is the stencil, which constitutes a barrier layer or a coating situated on or in the screen and makes the printing pattern impermeable to ink at the locations that are not intended to print. Commonly used for production of the stencil are the direct method (direct stencil) and the indirect method (indirect stencil), the direct method being preferred. In the direct stencil, the fabric is coated with a light-sensitive layer, exposed, and developed. The stencil is thus produced directly on the fabric. In the indirect method, the stencil is first produced on a carrier and then transferred to the screen. The other steps for producing the stencil are analogous.

In general, the stencil is formed by a photomechanical process. For this, the screen or a carrier is coated with a light-sensitive composition, also referred to as an emulsion, or a light-sensitive film is applied to the screen or the carrier. Then, the desired pattern of light-impermeable regions and light-permeable regions is imaged onto the light-sensitive layer obtained, for example, by means of a slide projection or a copy or in the CTS method ("computer to screen"), and the layer is exposed to UV light. In the light-permeable regions, the layer is cured by the UV light and forms the stencil or the non-printing region. In the light-impermeable regions, the layer is not cured and can subsequently be washed out, forming the printing regions of non-coated fabric. In the indirect method, the stencil formed is subsequently transferred to the screen.

The printing pattern thus produced corresponds to the printing pattern normally used. However, according to the invention, it is essential to the invention that, additionally, the printing region of the printing pattern for the busbar and/or the printing region of the printing pattern for the solder contact surface is at least partially provided with a dot matrix or a line matrix. The dot matrix or dot pattern constitutes an arrangement of multiple rows of points arranged next to one another. The line matrix or line pattern constitutes an arrangement of multiple lines arranged in parallel (parallel line array).

The embodiment with a dot matrix is preferred since the construction of a dot matrix is easier to carry out and, thus, lower susceptibility to errors has been found in the printing process.

The dots of the dot matrix or the lines of the line matrix are formed, like the stencil, from a barrier layer situated on or in the screen by a photomechanical method. It goes without saying that the dots of the dot matrix or the lines of the line matrix are expediently formed together with the stencil, as described above. For this, the corresponding dot matrix or the line matrix must also be included for the imaging of the desired pattern on the light-sensitive coating, e.g., by means of slide projection, CTS process, or copying.

In the embodiment with the dot matrix, the dots can have any geometry. They can, for example, be rectangular, square, elliptical, or circular dots, circular dots being preferred.

It should be noted that the areas of the print pattern referred to as dots are the areas initially free of coating in the printing process, in which no silver print is applied, whereas according to the invention the region surrounding these dots is provided with silver print. This printed region of the solder contact surface is electrically conductively connected to the remaining area of the associated busbar. Usually, this is achieved by continuous silver printing between these regions with a common stencil. When the structured printing region is in the form of lines instead of a dot pattern, coating-free lines that are arranged alternatingly with the printed lines result. The lines applied by means of silver printing run substantially parallel to one another and parallel to the coating-free lines situated therebetween. Preferably, the structured printing region is dimensioned such that the structuring (points or lines) is too small for an exact printing result. The printing ink thus runs into the initially coating-free areas. According to the printing methods known in the customary prior art such running of the printing ink would be undesirable and constitute a rejection criterion for the resulting product. Consequently, it was surprising and unexpected for the person skilled in the art that by intentionally causing this, a significant improvement in the printing result and in the printing height can be achieved.

The dimensions of the dots of the dot matrix are below the resolution, preferably just below the resolution, of the printing pattern, i.e., the limit of printable dot finenesses, which is, in particular, a function of the thread diameter and the thread spacing of the screen mesh. Consequently, during printing, the ink below the dots runs together and the dot matrix is not visible in the printed coating. To the human eye, the region below the dot pattern will appear completely printed. Only with a microscope or in cross-section can relatively small hill and valley regions be detected (cf. FIG. 2).

The dots of the dot matrix preferably have a diameter in the range from 0.10 mm to 0.3 mm, more preferably 0.16 to 0.2 mm. This applies to circular dots. If the dots are not circular, these ranges apply to largest dimension of the dots. The dots of the dot matrix can be of the same or different size but are preferably of the same size.

The distance between the dots of the dot matrix, i.e., the distance between the centers of adjacent dots is preferably in the range from 1 D to 3 D, preferably 1.75 D to 2.25 D, particularly preferably 1.9 D to 2.1 D, where D is the dot diameter or the largest dimension of the dot. This means, for example, in the case of a dot diameter of 0.2 mm, a distance of 0.3 to 0.5 mm, preferably 0.35 to 0.45 mm, and particularly preferably 0.38 to 0.42 mm.

In the alternative embodiment with the line matrix, the line matrix is formed by lines or straight lines running parallel to one another. The dimensions of the lines of the line matrix are below the resolution, preferably just below the resolution, of the printing pattern, i.e., the limit of printable line finenesses, which is, in particular, a function of the thread diameter and thread spacing of the screen mesh. Consequently, during printing, the ink below the lines runs together and the line matrix is not visible in the printed coating. To the human eye, the region below the line pattern will appear completely printed. Only with a microscope or in cross-section can relatively small hill and valley regions be detected.

The lines of the line matrix preferably have a line width in the range from 0.1 mm to 0.4 mm. The lines of the line matrix can have the same or different widths but are preferably of the same width. The distance between adjacent lines of the line matrix is, for example, in the range from 0.1 mm to 0.4 mm. The distance refers here to the distance of the central axis in the longitudinal direction of one line to the central axis of the adjacent line. The distance of the lines of the line matrix from one another is preferably in the range from 0.7 B to 2.5 B, preferably 0.8 B to 2.2 B, more preferably 0.8 B to 1.2 B, where B is the line width of the line.

Here, "layer thickness" of the stencil and layer thickness of the dots of the dot matrix and "layer thickness" of the lines of the line matrix means the total thickness of the coating in the region of the stencil or in the region of the dots of the dot matrix or in the region of the lines of the line matrix.

The layer thickness of the dots of the dot matrix and of the lines of the line matrix can, for example, be in the range from 10 to 100 μm, preferably in the range from 10 to 80 μm and particularly preferably in the range from 10 to 30 μm.

The layer thickness of the stencil and the layer thickness of the dots of the dot matrix or of the lines of the line matrix can be the same or different. In a preferred embodiment, the layer thickness of the dots of the dot matrix or of the lines of the line matrix is greater than the layer thickness of the stencil. By means of an increased layer thickness of the dots of the dot matrix or of the lines of the line matrix, an increase in the layer thickness of the busbar at the locations of the dot matrix or line matrix can be achieved. This can be achieved by partial subsequent coating of the regions in which the dot matrix or line matrix was applied. In other words, after coating of the non-printing regions and the regions of the dots of the dot matrix or the regions of the lines of the line matrix, the coating operation is repeated, but only in the region of the region of the dot matrix or line matrix.

Thus, in a preferred embodiment, during production of the printing pattern after coating the screen in the non-printing regions and in the region of the dot matrix or line matrix, a partial subsequent coating in the region of the dot matrix or line matrix is carried out in order to obtain an increased layer thickness of the dots or lines compared to the layer thickness of the stencil. The layer thickness of the dots or lines can, for example, be in the range of 1.5 to 2.5 times the layer thickness of the stencil.

The printing region surface of the printing pattern for the busbar can, if it is to be provided with a dot matrix or a line matrix, be provided, partially or completely, with the dot matrix or line matrix, with the printing region surface preferably partially provided with the dot matrix or line matrix. It is possible for example, for 1 to 100%, preferably 5 to 100%, particularly preferably 15 to 75%, of the area of the printing region of the printing pattern for the busbar to be provided with the dot matrix or line matrix.

If the busbar has wider and narrower sections, it usually suffices for the busbar to be printed thicker in the wider sections, in particular, in the sections with maximum width, such that only the printing regions of the printing pattern intended for this can be provided with the dot matrix or line matrix.

In a preferred embodiment, the printing region of the printing pattern for the busbar is partially provided with the dot matrix or the line matrix and the printing region provided with the dot matrix or the line matrix is arranged at the locations of the solder contact surface(s) of the busbar. As explained above, the highest current occurs at these locations such that a thicker busbar can effectively contribute to better current distribution at these locations.

The printing region surface of the printing pattern for the solder contact surface can, if it is to be provided with a dot matrix or line matrix, be provided, partially or completely, with the dot matrix or line matrix, with the printing region surface preferably provided partially with the dot matrix or line matrix. For example, 1 to 100%, preferably 5 to 100%, preferably 15 to 75%, of the area of the printing region of the printing pattern for the busbar can be provided with the dot matrix or the line matrix.

By using the dot matrix or the line matrix for the printing region of the printing pattern for the solder contact surface, a more robust solder contact surface can be obtained. This has the advantage that the functions of the solder contact surface, such as the stability of the adhesion to a connection element, can be achieved even with a lower layer thickness. At the same time, compared to the otherwise identical screenprint, but without a dot matrix or a line matrix, greater thickness of the silver is achieved, as a result of which the strength of the solder connection with the connection elements soldered thereon is improved, in particular in the case of lead-free connection elements.

Providing the area of the printing region of the printing pattern for the solder contact surface with the dot matrix or line matrix is suitable in particular for solder contact surfaces for an antenna, solder contact surfaces for an alarm loop, and for solder contact surfaces of busbars situated in the region of the top or bottom side edge of the glass pane. Providing the area of the printing region of the printing pattern for the solder contact surface with the dot matrix or line matrix is suitable in particular for solder contact surfaces that are not positioned in the region of the right or left side edge of the glass pane.

For the screen printing, the printing pattern produced with at least one dot matrix or one line matrix is used in a subregion of the printing region as described above. Otherwise, the screen printing is done as known in the prior art.

The printing pattern is positioned on the glass pane. The printing ink is applied and evenly distributed on the upper side of the right printing pattern. The printing ink is then doctored onto the glass pane through the mesh openings of the screen with a doctor blade into the printing regions. In general, the glass pane makes contact with the screen only in the immediate printing zone due to the doctor blade. By means of a higher distance, the so-called "jump", the glass pane is more easily separated from the screen after the printing phase.

A silver paste or conductive silver paste is used as printing ink. Common commercial products can be used. Silver pastes or conductive silver pastes usually contain high amounts of silver or silver alloy, e.g., 30 to 88 wt.-%, as powder or flakes, organic binders, organic solvents, and, optionally, other additives.

At the points where the corresponding printing region of the printing pattern has a dot matrix or a line matrix, a thicker and more uniform layer thickness of the busbar is obtained compared to a screen print in which no dot matrix or line matrix is used, but which is otherwise the same.

The height of the printed busbar before baking is, for example, 25 to 100 μm, preferably 30 to 80 μm at the locations that are printed by the printing region of the printing pattern provided with the dot matrix or the line matrix. The height refers to the thickness before baking, i.e., to the wet layer thickness.

Depending on the silver paste or conductive silver paste used, the screen printing can be followed by a drying operation, which can, optionally, also be carried out at an elevated temperature.

The method according to the invention also includes the step of baking the printed silver coating. Baking temperature and duration depend on the type of silver paste used. The baking operation can, for example, be carried out at a temperature in the range from 400 to 700° C. The duration of the heat treatment can, for example, be 5 s to 200 s.

As usual, the glass pane can be made of inorganic glass, in particular silicate glass. Examples include soda lime glass, borosilicate glass, aluminosilicate glass, or quartz glass. The glass pane is preferably a single-pane safety glass or a laminated glass.

The glass pane can have a coating, preferably a coating with a ceramic paint, such as a black ceramic paint, in one or a plurality of edge regions, preferably all edge regions. The person skilled in the art is familiar with such opaque coatings in the edge region of vehicle glazings under the term "masking print". A coating of the side edges with ceramic paint serves, for example, to conceal adhesive bonds used when mounting a glass pane on a vehicle. The busbars of the silver coating are preferably printed onto this coating, in particular onto the ceramic paint coating.

The glass pane provided with silver coating is preferably a heatable glass pane, in particular a heatable vehicle pane, in particular a rear window.

The invention also relates to a glass pane with a silver coating that includes at least one busbar and/or at least one solder contact surface that is obtainable in accordance with the method described above according to the invention. The product features disclosed in the description of the process are fully applicable to the glass pane according to the invention and need not be repeated here. Conversely, the features disclosed in the description of the product also apply to the method according to the invention.

The glass pane according to the invention includes at least one busbar and/or the solder contact surface with a printed silver coating that is at least partially provided with a dot matrix or a line matrix, wherein the layer thickness of the printed silver coating in the region of the dots of the dot matrix or of the lines of the line matrix is less than the layer thickness in the printing region of the dot matrix or line matrix surrounding the dots or lines. The size dimensions of the dots of the dot matrix and of the lines of the line matrix are below the resolution of the human eye, but are detectable on the product by microscopic examination. The structuring of the silver print of the glass pane is achieved by using the process according to the invention. A particular advantage of the glass pane according to the invention, as described for the method according to the invention, is the greater current-carrying capacity in the region of the dot matrix.

In a preferred embodiment of the glass pane according to the invention, the layer thickness of the printed silver coating in the region of the dots of the dot matrix or of the lines of the line matrix is in the range from $_{10}$ to 30 μm and the layer thickness of the printed silver coating in the region surrounding the dots or lines of the dot matrix or line matrix is in the range from 30 to 80 μm. The layer thickness in the region of the dots or lines is selected smaller than the layer thickness in the printing region surrounding the dots or lines. This ratio has proved to be particularly advantageous in terms of optimization of the current-carrying capacity while, at the same time, using as little material as possible. The layer thicknesses mentioned refer to the wet layer thickness.

In the following, the invention is explained based on nonrestrictive exemplary embodiments with reference to the accompanying drawings.

Figure 1:
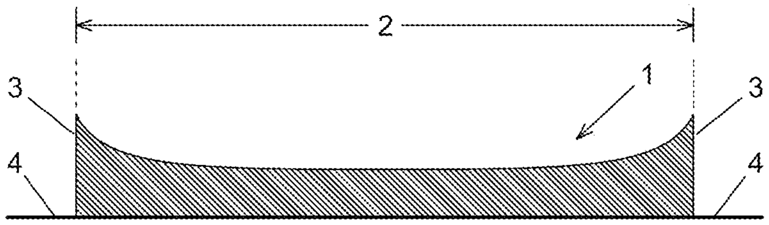
FIG. 1 schematically shows a cross-section of a busbar before baking, which was printed according to the prior art.

They Depict:

FIG. 1: schematically, a cross-section of a busbar 1 before baking, which was printed according to the prior art on a surface 4 of a glass pane (not shown). With this prior art screen print, there is no dot matrix and no line matrix in the printing region of the printing pattern. There are clear print shoulders 3 at the edges, whereas, in the center, only a little material is applied. Overall, there is a very uneven distribution of the printing material over the width of the busbar 2.

Figure 2:
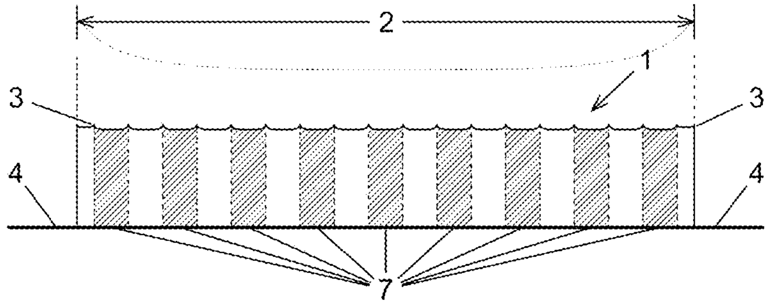
FIG. 2 schematically, a cross-section of a busbar 1 before baking, which was printed according to the method according to an embodiment of the invention.

FIG. 2: schematically, a cross-section of a busbar 1 before baking, which was printed according to the method according to the invention with a dot matrix on a surface 4 of a glass pane (not shown). With this busbar printed according to the invention, there are no significant print shoulders, the distribution of the printing material over the width of the busbar 2 is uniform, even in the center of the busbar under the region of the dots of the dot matrix 7. The division into hatched and white regions of the busbar is intended only to illustrate the regions that that lie under a dot (hatched) or not under a dot (white) during printing. The printed-on material is situated both in the hatched and in the white regions. When viewed under a microscope, a plurality of small elevations 3, which appear at the locations that correspond to the printing regions between the individual matrix dots, can be seen.

Figure 3:
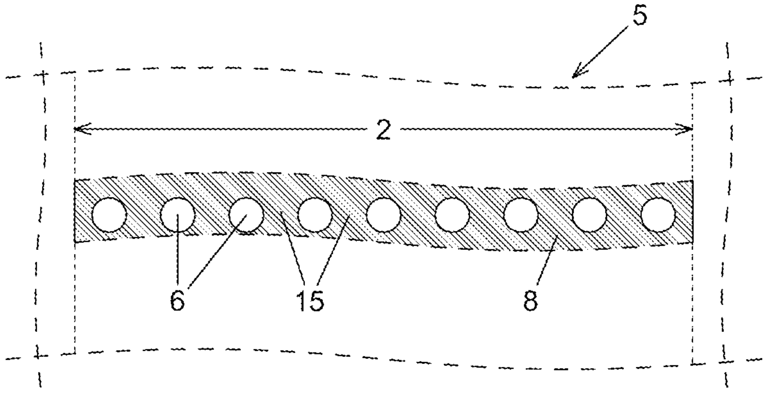
FIG. 3 schematically shows a plan view of a detail of the printing pattern with matrix dots according to an embodiment of the invention.

FIG. 3: schematically, a plan view of a detail of the printing pattern with matrix dots 6 for the printing region of the busbar of FIG. 2 with the uncoated screen surfaces 8 and the dots 6 (coated screen). Since the dot dimension is below the resolution of the printing pattern, the silver paste runs together under the dots, during printing. The spaces 15 between the dots result in the small print shoulders 3 depicted in FIG. 2.

Figure 4:
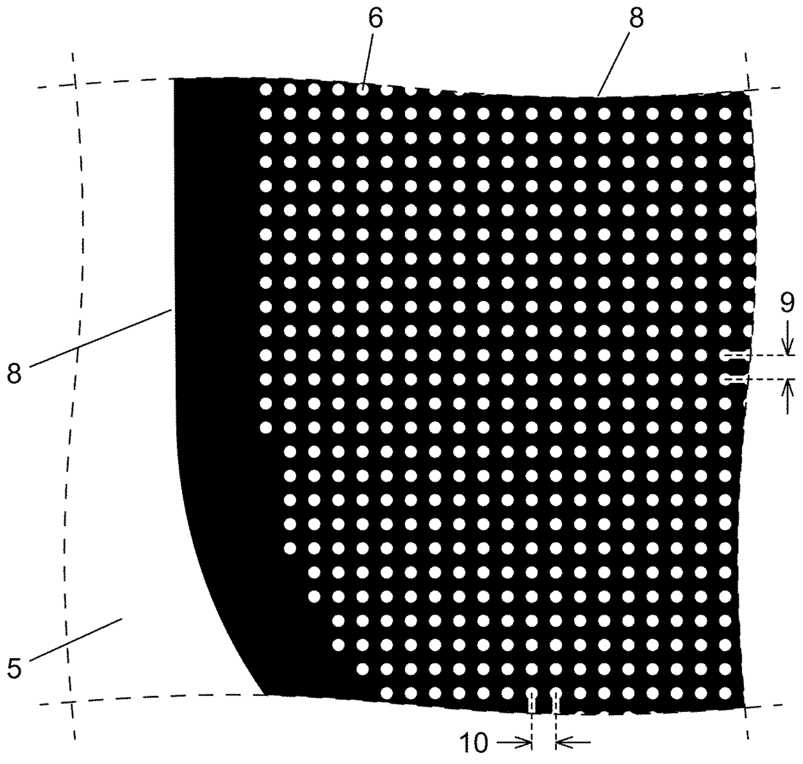
FIG. 4 schematically shows a plan view of a larger detail of the printing region of the printing pattern with matrix dots per FIG. 3.

FIG. 4 schematically, a plan view of a larger detail of the printing region of the printing pattern 5 with matrix dots per FIG. 3. The screen of the printing pattern can, for example, be a polyester screen. The black regions 8 represent the open meshes of the screen and the white regions represent the coated regions of the dot matrix or the dots 6. The layer thickness of the dots can, for example, be in the range from 10 to 80 μm. The diameter of the dots is 0.2 mm. The distance 9 between adjacent dots is 0.4 mm, both between the adjacent dots within a row and between the adjacent dots of different rows.

Figure 5:
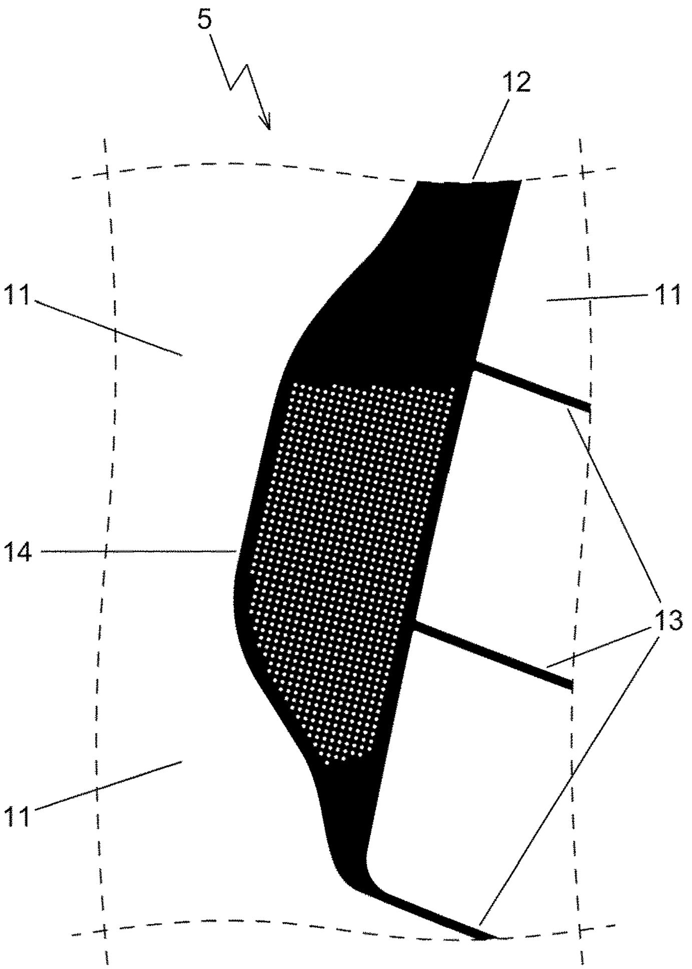
FIG. 5 schematically shows a glass pane according to an embodiment of the invention.

FIG. 5 schematically, a plan view of an even larger detail of the printing region of the printing pattern 5 with matrix dots per FIG. 4. This detail shows a part of the stencil 11 (non-printing region, all-over coated screen) as well as a part of the printing region for a busbar 12 and heating conductors 13 extending therefrom. The printing region of the busbar has a dot matrix in a subregion 14. In particular, the dot matrix depicted in the region 14 is, for practical reasons, not drawn to scale. In true-to-scale representation, the dots would be significantly smaller.

Figure 6:
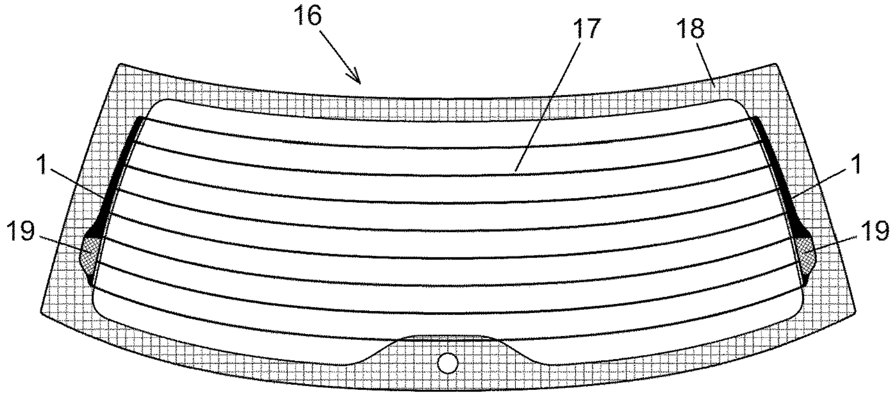
FIG. 6 schematically shows a glass pane according to an embodiment of the invention.

FIG. 6 schematically, a glass pane 16 according to the invention made of single pane safety glass or laminated safety glass with a silver coating that includes busbars 1 and heating conductors 17. The glass pane is provided, at the side edges, with a coating of black ceramic paint 18 onto which the busbars 1 had been printed. The silver coating was printed with a printing pattern per FIGS. 3 to 5 by screen printing with a silver paste onto the glass pane. The regions 19 of the busbars 1 correspond to the printed region surfaces 14 of the printing pattern per FIG. 5 provided with the dot matrix. The regions 19 can serve as a solder contact surface of the busbar in order to solder the connection elements on at that location. A cross-section of the busbar 1 in the region 19 is depicted in FIG. 2. The printed-on silver coating is subsequently baked by heat treatment.

Figure 7:
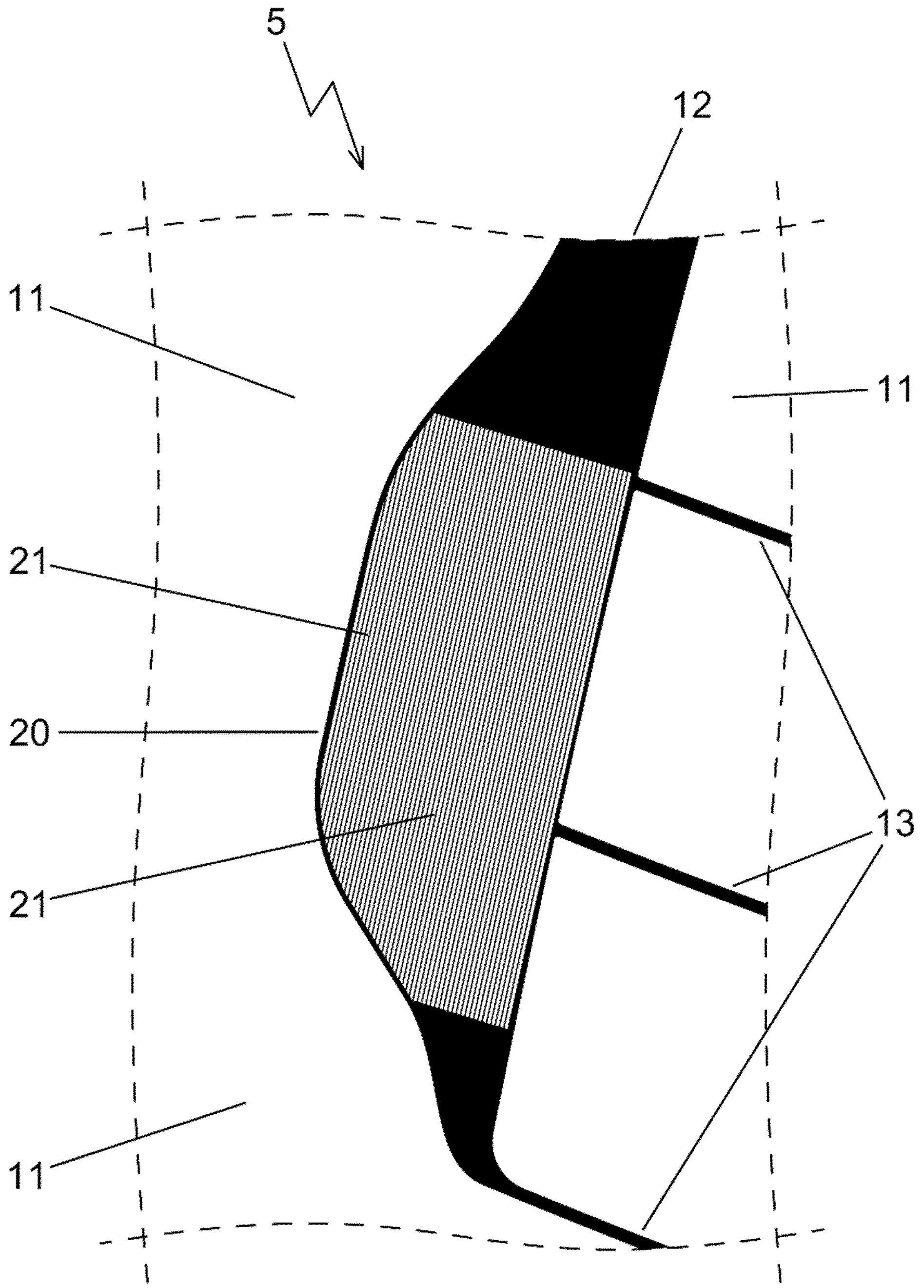
FIG. 7 schematically, a plan view of a detail of a printing region of a printing pattern according to an embodiment of the invention.

FIG. 7 schematically, a plan view of a detail of a printing region of a printing pattern 5, in which the printing region per the alternative embodiment is partially provided with a line matrix 20. The black regions 8 represent the open meshes of the screen, and the white regions represent the coated regions of the line matrix 20 or the lines 21. The layer thickness of the lines can, for example, be in the range from 10 to 80 μm. The line width can be in the range from 0.1 mm to 0.4 mm. The distance between adjacent lines can, for example, be 0.1 mm to 0.4 mm. The detail of a printing region of a printing pattern depicted corresponds roughly to the detail of a printing pattern for a busbar depicted in FIG. 4, except that there is a line matrix instead of a dot matrix.

LIST OF REFERENCE CHARACTERS

1 busbar (silver print)
2 width of the busbar
3 print shoulder
4 glass surface of the glass pane
5 printing pattern
6 matrix dot (coated screen)
7 region under matrix dot
8 uncoated screen surface
9 vertical dot spacing
10 horizontal dot spacing
11 coated screen mesh (stencil)
12 uncoated screen mesh for busbar
13 uncoated screen mesh for heating conductors
14 printing region of the screen with dot matrix
15 printing region between matrix dots
16 glass pane
17 heating conductor
18 coating with ceramic paint
19 region of the busbar printed with dot matrix
20 printing region of the screen with line matrix
21 matrix line (coated screen)

The invention claimed is:

1. A method for producing a silver coating on a glass pane, wherein the silver coating includes at least one busbar and/or at least one solder contact surface, wherein the method comprises printing the silver coating onto the glass pane to form a printed silver coating by screen printing with a screen including a printing pattern having printing and non-printing regions and baking the printed silver coating, wherein the printing region of the printing pattern for the busbar and/or the printing region of the printing pattern for the solder contact surface is provided at least partially with a dot matrix or a line matrix, and wherein the dimensions of the dots of the dot matrix of the printing region of the screen are below the resolution of the printing pattern or the dimensions of the lines of the line matrix of the printing region of the screen are below the resolution of the printing pattern.

2. The method according to claim 1, wherein the silver coating includes at least one busbar and a plurality of heating conductors and, optionally, at least one solder contact surface for an alarm loop and/or an antenna.

3. The method according to claim 1, wherein the busbar has a maximum width in the range from 9 to 30 mm.

4. The method according to claim 1, wherein a height of the printed busbar and/or of the printed solder contact surface before baking at the locations that are printed with the printing region of the printing pattern provided with the dot matrix or the line matrix is in the range from 25 to 100 μm.

5. The method according to claim 4, wherein the height is in the range from 30 to 80 μm.

6. The method according to claim 1, wherein the dots of the dot matrix have a diameter in the range from 0.14 mm to 0.22 mm, and/or wherein the lines of the line matrix have a width in the range from 0.1 mm to 0.4 mm.

7. The method according to claim 6, wherein the diameter is in the range from 0.16 mm to 0.2 mm.

8. The method according to claim 1, wherein a distance between adjacent dots of the dot matrix is in the range from 1.5 D to 2.5 D, where D is the dot diameter.

9. The method according to claim 8, wherein the distance between adjacent dots of the dot matrix is in the range from 1.9 D to 2.1 D.

10. The method according to claim 1, wherein a layer thickness of the dots of the dot matrix or of the lines of the line matrix is in the range from 10 to 80 μm.

11. The method according to claim 10, wherein the layer thickness is in the range from 10 to 30 μm.

12. The method according to claim 1, wherein 1 to 100% of the area of the printing region of the printing pattern for the busbar is provided with the dot matrix or the line matrix and/or 1 to 100% of the area of the printing region of the printing pattern for the solder contact surface is provided with the dot matrix or the line matrix.

13. The method according to claim 12, wherein 15 to 75% of the area of the printing region of the printing pattern for the busbar is provided with the dot matrix or the line matrix and/or 15 to 75% of the area of the printing region of the printing pattern for the solder contact surface is provided with the dot matrix or the line matrix.

14. The method according to claim 1, wherein the printing region of the printing pattern for the busbar is partially provided with the dot matrix or the line matrix and the printing region provided with the dot matrix or the line matrix is arranged in the vicinity of solder contact surfaces of the busbar.

15. The method according to claim 1, wherein the glass pane is a single-pane safety glass or a laminated glass pane.

16. The method according to claim 1, wherein the glass pane has a coating in one or a plurality of edge regions, and the busbar is printed onto the coating.

17. The method according to claim 1, wherein the glass pane provided with the silver coating is a heatable glass pane.

18. The method according to claim 1, wherein during production of the printing pattern after coating the screen in the non-printing regions and in the region of the dot matrix or of the line matrix, partial subsequent coating is carried out in the region of the dot matrix or of the line matrix in order to obtain an increased layer thickness of the dots or lines.

19. A glass pane with a silver coating that includes at least one busbar and/or at least one solder contact surface obtainable by a method according to claim 1, wherein the busbar and/or the solder contact surface includes a printed silver coating that is provided at least partially with a dot matrix or a line matrix and the layer thickness of the printed silver coating in the region of the dots of the dot matrix or of the lines of the line matrix is less than the layer thickness of the printed silver coating in the region of the dot matrix or line matrix surrounding the dots or lines.

* * * * *